United States Patent
Okada

(10) Patent No.: US 9,817,616 B2
(45) Date of Patent: Nov. 14, 2017

(54) SERVERLESS IMAGE PROCESSING SYSTEM WITH A PLURALITY OF APPARATUS GROUPS AND IMAGE FORMATION APPARATUS FOR MEDIATING COMMUNICATION BETWEEN APPARATUS GROUPS

(71) Applicant: KONICA MINOLTA, INC., Chiyoda-ku, Tokyo (JP)

(72) Inventor: Tatsunori Okada, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/848,606

(22) Filed: Sep. 9, 2015

(65) Prior Publication Data
US 2016/0077774 A1   Mar. 17, 2016

(30) Foreign Application Priority Data
Sep. 12, 2014   (JP) .................................. 2014-186416

(51) Int. Cl.
*G06F 3/12* (2006.01)

(52) U.S. Cl.
CPC .......... *G06F 3/1212* (2013.01); *G06F 3/1267* (2013.01); *G06F 3/1291* (2013.01)

(58) Field of Classification Search
CPC ........... H04N 1/00509; H04N 1/00156; H04N 1/33338; H04N 1/2183; H04N 1/32491;
(Continued)

(56) References Cited

U.S. PATENT DOCUMENTS

2006/0274359 A1* 12/2006 Fukui .................... G06F 21/608
                                                           358/1.15
2008/0052342 A1    2/2008 Koga
(Continued)

FOREIGN PATENT DOCUMENTS

| JP | 2006-339945 A | 12/2006 |
|----|---------------|---------|
| JP | 2008-049515 A | 3/2008  |
| JP | 2013-033443 A | 2/2013  |

OTHER PUBLICATIONS

Office Action (Notice of Grounds of Rejection) dated Dec. 6, 2016 issued by the Japanese Patent Office in corresponding Japanese Patent Application No. 2014-186416, and English language translation of Office Action (16 pages).

*Primary Examiner* — Henok A Shiferaw
(74) *Attorney, Agent, or Firm* — Buchanan Ingersoll & Rooney PC

(57) ABSTRACT

When an image formation apparatus included in an image processing system including a plurality of apparatus groups each consisting of a plurality of image formation apparatuses accepts a request for an inquiry about an image formation apparatus which has stored a print job associated with a designated user from another image formation apparatus belonging to an apparatus group to which the image formation apparatus belongs, the image formation apparatus requests, in response to the request, of an image formation apparatus which belongs to another apparatus group and is saved in advance, for the inquiry. When the request originates from another image formation apparatus belonging to another apparatus group, the image formation apparatus inquires of a management image formation apparatus within that apparatus group.

26 Claims, 12 Drawing Sheets

(58) Field of Classification Search
CPC . H04N 1/32448; G06F 3/1262; G06F 3/1263; G06F 3/1265; G06F 3/1268; G06F 3/1269; G06F 3/1296; G06K 15/18; G06K 9/03; G06K 15/40
See application file for complete search history.

(56) References Cited

U.S. PATENT DOCUMENTS

2012/0099149 A1*  4/2012  Inoue .................... G06F 3/1204
                                                      358/1.15
2013/0003125 A1*  1/2013  Morii ................. G06K 15/1817
                                                      358/1.15

* cited by examiner

FIG.4

| CONTENTS IN REQUEST | PRIORITY | ORDER OF PRECEDENCE |
|---|---|---|
| INQUIRY ABOUT STORAGE MFP FROM MEDIATION MFP IN ANOTHER GROUP | HIGH | 1 |
| INQUIRY OF MANAGEMENT MFP ABOUT STORAGE MFP | HIGH | 2 |
| REQUEST FOR JOB INFORMATION FOR LIST DISPLAY | HIGH | 3 |
| REQUEST FOR PRINTING | HIGH | 4 |
| REQUEST FOR DELETION OF FILE | LOW | 5 |
| REQUEST FOR THUMBNAIL INFORMATION FOR THUMBNAIL DISPLAY | LOW | 6 |
| REQUEST FOR PREVIEW INFORMATION FOR PREVIEW DISPLAY | LOW | 7 |

SERVERLESS IMAGE PROCESSING SYSTEM WITH A PLURALITY OF APPARATUS GROUPS AND IMAGE FORMATION APPARATUS FOR MEDIATING COMMUNICATION BETWEEN APPARATUS GROUPS

This application is based on Japanese Patent Application No. 2014-186416 filed with the Japan Patent Office on Sep. 12, 2014, the entire content of which is hereby incorporated by reference.

BACKGROUND OF THE INVENTION

Field of the Invention

This disclosure relates to an image processing system and an image formation apparatus and particularly to an image processing system including a plurality of image formation apparatuses and an image formation apparatus included in the system.

Description of the Related Art

A system in which image formation apparatuses such as a plurality of multi-functional peripherals (MFP) are connected to a network and printing can be carried out by logging in any image formation apparatus, or what is called ubiquitous printing can be carried out, has been proposed. This system is called a ubiquitous printing system in one aspect.

Since an image formation apparatus has come to function as a server with a function of the image formation apparatus being more sophisticated, a system includes no server. Such a system is also called a serverless ubiquitous printing system.

In the serverless ubiquitous printing system, any image formation apparatus exhibits a server function and functions as a server and passes a job list to an image formation apparatus in which a user has logged. Thus, in the image formation apparatus in which the user has logged, the user can check a job issued by the user himself/herself and saved in a memory of the image formation apparatus functioning as the server, and can indicate printing.

Such a system is constructed, for example, in an office environment in many cases. Therefore, with expansion of the office, the need for inclusion of a larger number of image formation apparatuses in the system has increased.

SUMMARY OF THE INVENTION

With increase in number of image formation apparatuses constructing the system, however, a single image formation apparatus is required to have multi-task processing capability for simultaneously processing accesses from a large number of image formation apparatuses. In order to enable multi-task processing in the image formation apparatus, a highly sophisticated operation unit or a large-capacity memory is required, which makes a configuration complicated and expensive. On the other hand, with increase in number of common image formation apparatuses not having the multi-task processing capability in the system, when a single image formation apparatus is accessed by image formation apparatuses in number exceeding processing capability thereof, communication cannot be established simultaneously between the image formation apparatus and these other image formation apparatuses. Therefore, a time period until a job list for selection of a job to be processed becomes longer.

The present disclosure was made in view of such problems, and an object in one aspect is to provide an image processing system capable of achieving suppression of increase in processing time period without requiring a high function in spite of increase in number of image formation apparatuses included in an image processing system. In addition, an object in one aspect is to provide an image formation apparatus capable of achieving suppression of increase in processing time period without requiring a high function in spite of increase in number of image formation apparatuses included in an image processing system.

According to one embodiment, an image processing system is an image processing system including a plurality of apparatus groups each consisting of a plurality of image formation apparatuses. At least one image formation apparatus of the plurality of image formation apparatuses includes a printer which can carry out printing based on a print job, a memory which stores the print job transferred from another apparatus and associated with user information, and a controller. The controller is configured to obtain a selected print job from an image formation apparatus which has stored the print job. Each apparatus group includes a first image formation apparatus which can relay an inquiry about an image formation apparatus belonging to another apparatus group and a second image formation apparatus which can manage the print job stored in each image formation apparatus belonging to the apparatus group. The controller of the second image formation apparatus is further configured to obtain specifying information which is information specifying the print job by inquiring of another image formation apparatus whether or not the print job associated with a log-in user has been stored in the memory and present in a selectable manner, the print job stored in the image formation apparatus within the image processing system and associated with the log-in user, based on the specifying information. The controller of the first image formation apparatus is further configured to specify a corresponding image formation apparatus and answer to the inquiry by inquiring of the second image formation apparatus about the image formation apparatus which has stored the print job associated with the user designated in the inquiry when the inquiry from the image formation apparatus in another apparatus group is accepted.

Preferably, the first image formation apparatus has saved in advance access destination information of the image formation apparatus which belongs to another apparatus group and can relay the inquiry. Each of the plurality of image formation apparatuses has saved in advance access destination information of the first image formation apparatus and the second image formation apparatus within the apparatus group to which each of the plurality of image formation apparatuses belongs. The controller of each of the plurality of image formation apparatuses is further configured to give a notification of the specifying information of the print job and identification information of each of the plurality of image formation apparatuses itself based on the access destination information of the second image formation apparatus when the print job is stored in the memory, and inquire of the first image formation apparatus about the print job directed to the image formation apparatus belonging to another group based on the access destination information of the first image formation apparatus when a request for the print job stored in the memory of the image formation apparatus belonging to another apparatus group is made.

Preferably, the controller of the image formation apparatus is further configured to notify the second image formation apparatus within the apparatus group to which the image formation apparatus itself belongs of the specifying information of the print job stored in the memory.

Preferably, the controller of the image formation apparatus is further configured to request the first image formation apparatus in the apparatus group to which the image formation apparatus itself belongs to make an inquiry about the image formation apparatus belonging to another apparatus group. To obtain the specifying information includes obtaining the specifying information of the print job by requesting of the image formation apparatus which has stored the print job specified by the answer from the first image formation apparatus for the specifying information of the print job.

More preferably, the controller of the first image formation apparatus is further configured to request the first image formation apparatus in another apparatus group to inquire of the image formation apparatus in another apparatus group about the print job, when the inquiry about the print job associated with the log-in user is accepted from the image formation apparatus within the apparatus group to which the first image formation apparatus itself belongs, and inquire of the second image formation apparatus within the apparatus group to which the first image formation apparatus itself belongs about the image formation apparatus within the apparatus group to which the first image formation apparatus itself belongs, which has stored the print job associated with the log-in user, when a request for the inquiry is made by the first image formation apparatus in another group.

Preferably, the controller of the first image formation apparatus is further configured to determine whether or not the number of connections to other image formation apparatuses has reached a threshold value defined in advance, analyze contents of connections with other image formation apparatuses within the apparatus group to which the first image formation apparatus belongs and specify an order of precedence based on a priority of the contents of connections saved in advance, when the number of connections has reached the threshold value, and cut off connection to another image formation apparatus within the apparatus group to which the first image formation apparatus belongs in accordance with the order of precedence until the number of connections is within the threshold value.

More preferably, the controller of the first image formation apparatus is further configured to request of another image formation apparatus for re-connection after cut-off when connection to another image formation apparatus is cut off.

More preferably, the request includes a stand-by time period from cut-off until re-connection.

Preferably, cut-off of connection to another image formation apparatus further includes cut-off of connection to another image formation apparatus also based on a condition of load of the first image formation apparatus.

Preferably, the controller of the first image formation apparatus is further configured to determine whether or not the number of connections to other image formation apparatuses has reached a threshold value defined in advance, and to inquire includes refraining for a certain period of time from making one or more inquiries directed to the second image formation apparatus within the apparatus group to which the first image formation apparatus belongs and saving the one or more inquiries, when the number of connections has reached the threshold value, and after lapse of the certain period of time, making the saved one or more inquiries as combined into one inquiry to the second image formation apparatus.

According to another embodiment, an image formation apparatus is an image formation apparatus included in an image processing system including a plurality of apparatus groups each consisting of a plurality of image formation apparatuses. This image formation apparatus includes a memory which stores the print job associated with user information, a printer which carries out printing based on a print job, and a controller. The controller is configured to request of a predetermined image formation apparatus belonging to another apparatus group different from the apparatus group to which the image formation apparatus belongs for an inquiry about the print job when an inquiry about the print job associated with a log-in user is received from an image formation apparatus within the apparatus group to which the image formation apparatus belongs, and inquire of a management image formation apparatus within the apparatus group to which the image formation apparatus belongs, which can manage the print job stored in each image formation apparatus within the apparatus group, about the image formation apparatus within the apparatus group which has stored the print job associated with the log-in user, when a request for the inquiry is made from the image formation apparatus in another apparatus group.

Preferably, the image formation apparatus has saved in advance access destination information of the image formation apparatus which belongs to another apparatus group and can relay the inquiry. To request includes accessing the image formation apparatus which belongs to another apparatus group and can relay the inquiry, based on the access destination information and making a request for the inquiry.

Preferably, the controller is further configured to determine whether or not the number of connections to other image formation apparatuses has reached a threshold value defined in advance, analyze contents of connections with other image formation apparatuses within the apparatus group to which the image formation apparatus belongs and specify an order of precedence based on a priority of the contents of connections saved in advance, when the number of connections has reached the threshold value, and cut off connection to another image formation apparatus within the apparatus group to which the image formation apparatus belongs in accordance with the order of precedence until the number of connections is within the threshold value.

More preferably, the controller is further configured to request of another image formation apparatus for re-connection after cut-off when connection to another image formation apparatus is cut off.

More preferably, the request includes a notification of a stand-by time period from cut-off until re-connection.

Preferably, cut-off of connection to another image formation apparatus further includes cut-off of connection to another image formation apparatus also based on a condition of load of the image formation apparatus.

Preferably, the controller is further configured to determine whether or not the number of connections to other image formation apparatuses has reached a threshold value defined in advance. To inquire includes refraining for a certain period of time from making one or more inquiries directed to the management image formation apparatus within the apparatus group to which the image formation apparatus belongs and saving the one or more inquires, when the number of connections has reached the threshold value, and after lapse of the certain period of time, making the saved one or more inquiries as being combined into one inquiry to the management image formation apparatus.

According to another embodiment, a non-transitory computer-readable storage medium storing a program for controlling a computer mounted on an image formation apparatus. The image formation apparatus is included in an image processing system including a plurality of apparatus groups each consisting of a plurality of image formation apparatuses. This program causes the computer to accept a request for an inquiry about an image formation apparatus which has stored a print job associated with a designated user, from another image formation apparatus, request, in response to the request, of a predetermined image formation apparatus which belongs to another apparatus group different from an apparatus group to which the image formation apparatus belongs for an inquiry about the print job when another image formation apparatus is an image formation apparatus within an apparatus group to which the image formation apparatus belongs, and inquire, in response to the request, of a management image formation apparatus which is an image formation apparatus within an apparatus group to which the image formation apparatus belongs, which can manage the print job stored in each image formation apparatus within the apparatus group, about the image formation apparatus within the apparatus group which has stored the print job associated with the user when another image formation apparatus is an image formation apparatus in another apparatus group different from the apparatus group to which the image formation apparatus belongs.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram representing a specific example of a priority defined in advance for each content in a request.

DESCRIPTION OF THE PREFERRED EMBODIMENTS

Figure 1:
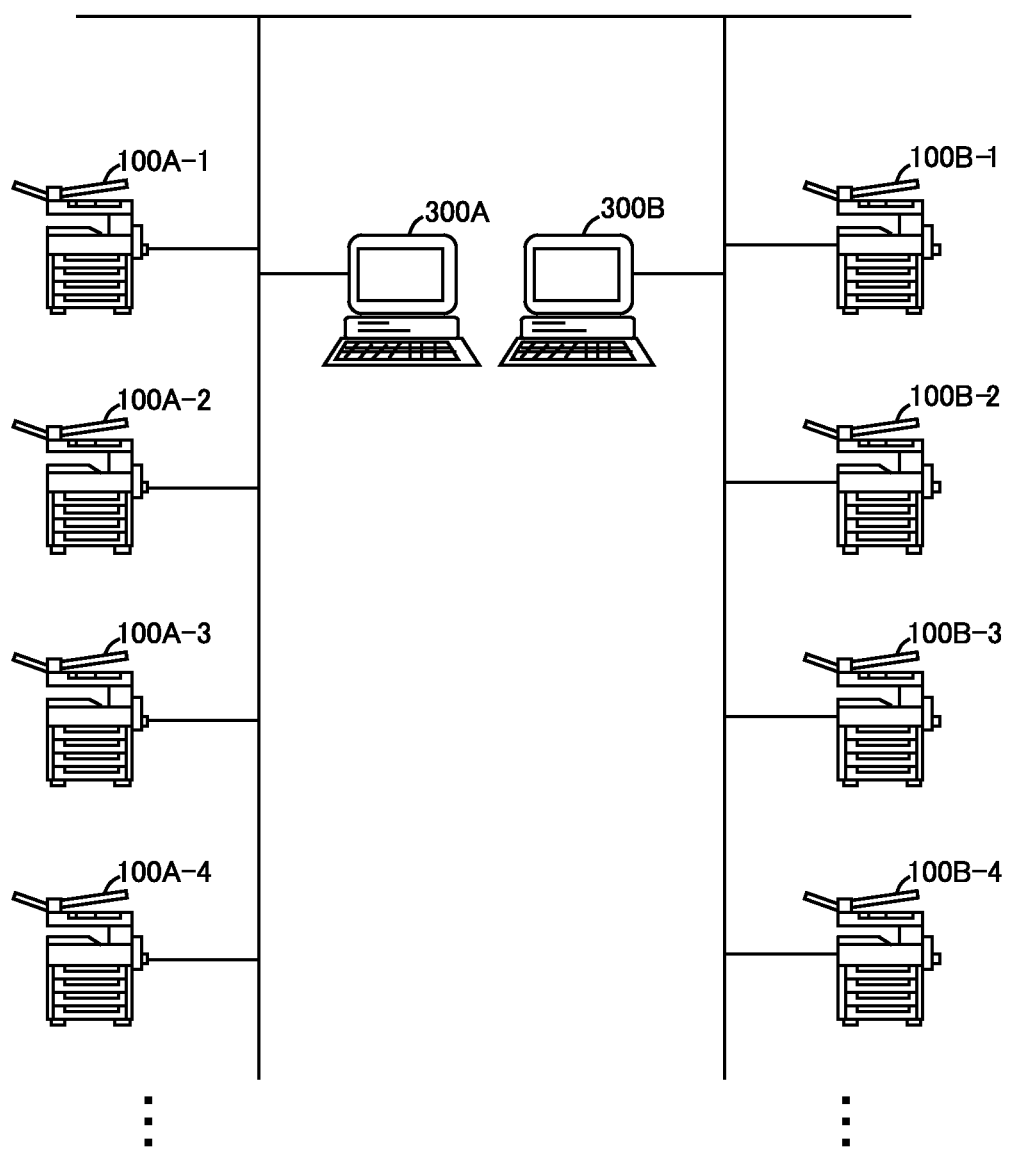
FIG. 1 is a diagram showing a specific example of a configuration of an image processing system (hereinafter a system) according to an embodiment.

An embodiment of the present invention will be described hereinafter with reference to the drawings. In the description below, the same elements and components have the same reference characters allotted. Their label and function are also identical. Therefore, description thereof will not be repeated.

FIG. 1 is a diagram showing a specific example of a configuration of an image processing system (hereinafter a system) according to an embodiment. Referring to FIG. 1, the present system includes a plurality of multi-functional peripherals (MFP) 100A-1, 100A-2, . . . , 100B-1, 100B-2, . . . as one example of an image formation apparatus having a printing function, and these are connected through a network. The plurality of MFPs are collectively represented as MFP 100.

The image formation apparatus having the printing function is not limited to an MFP, and a printer may be applicable.

Personal computers (PC) 300A and 300B representing one example of an information processing apparatus are connected to the network so as to be able to communicate. PCs 300A and 300B can each issue a job to MFP 100 included in the present system.

Figure 2:
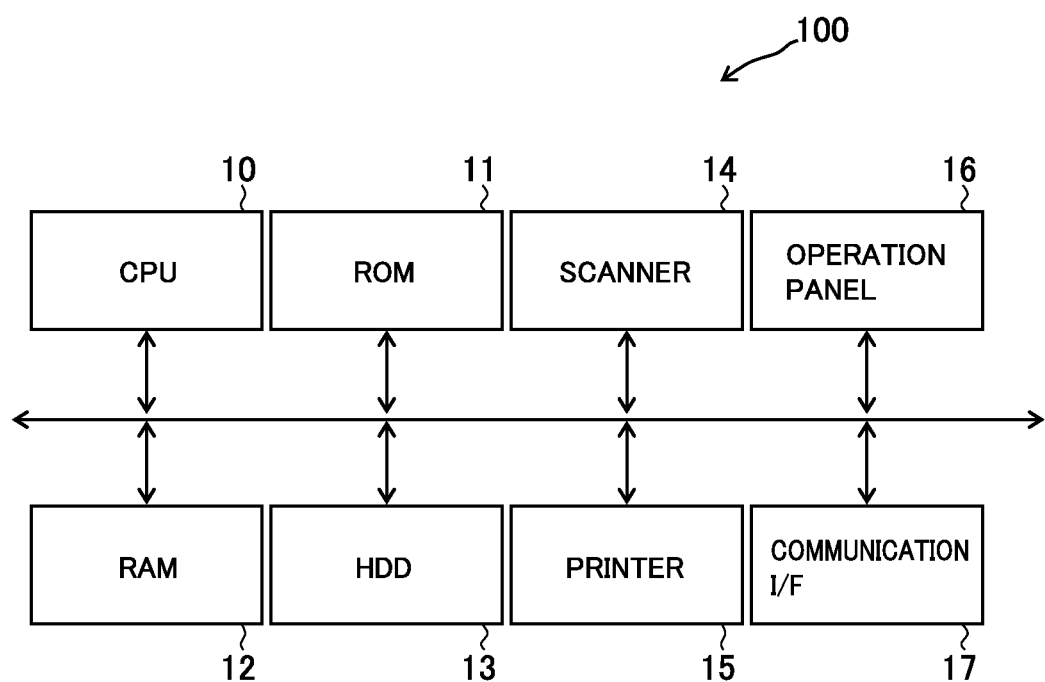
FIG. 2 is a block diagram showing a specific example of a device configuration of a multi-functional peripheral (MFP) included in the system.

FIG. 2 is a block diagram showing a specific example of a device configuration of MFP 100. Referring to FIG. 2, MFP 100 includes a central processing unit (CPU) 10 for overall control of an apparatus, a read only memory (ROM) 11 which is a memory for saving a program executed by CPU 10, a random access memory (RAM) 12 which is a memory serving as a work area in execution of a program by CPU 10, a hard disk drive (HDD) 13 representing one example of a large-capacity storage device for saving image data, a scanner 14, a printer 15, an operation panel 16, and a communication interface (I/F) 17 for communicating with another apparatus through the network.

A job for printing (hereinafter also simply referred to as a "job") is transferred from an information processing apparatus which can be connected to the system, such as a PC, to an MFP included in the present system. The job for printing includes, for example, a command for controlling a printing operation such as a printer job language (PJL) and an image for printing.

The MFP which has accepted the job has the memory save the job in association with a user. The MFP of which memory has saved the job is also referred to as a "storage MFP".

The MFP included in the present system accepts log-in by a user. The MFP in which the user has logged is also referred to as a "client MFP".

The client MFP requests of another MFP within the system for job information which is information on the job, such as information specifying a job associated with a user who has logged in (a log-in user). Namely, the client MFP inquires of another MFP whether or not there is a job associated with the log-in user. The storage MFP of which memory has saved the job corresponding to the inquiry returns job information of the corresponding job to the client MFP in response to the inquiry. The job information includes specifying information which is information allowing the job to be specified and identification information allowing identification of an MFP of which memory has saved the job. The specifying information of the job includes, for example, a name of a user who has issued the job and a file name.

The client MFP presents a list of jobs associated with the log-in user in a selectable manner, based on the job information obtained from the storage MFP. The user selects from the presented list, a job of which printing is desired. The client MFP obtains the selected job from the storage MFP of which memory has saved the job in response to the operation by the user and performs print processing.

The system performing the operation above is also called a "serverless ubiquitous system." By making use of the serverless ubiquitous system, the user can issue a job to any MFP in the system or have an MFP in which the user has logged perform processing for printing the job by logging in any MFP, to thereby obtain a printed matter. Namely, the user can log in any MFP within the system at any timing without paying attention to which MFP has saved the job and can have the MFP perform the processing for printing the job.

As shown in FIG. 1, in some cases, a large number of MFPs are included in the system. In this case, the client MFP should inquire of many MFPs whether or not there is a job associated with a log-in user. Therefore, as the number of MFPs included in the system is greater, an amount of processing performed at a time by the client MFP is greater, which leads to the client MFP required to have high processing capability. In addition, a time period until a list is displayed is longer, which leads also to significant lowering in operability of a user.

The present system is divided into a plurality of apparatus groups each consisting of a plurality of MFPs. In the example in FIG. 1, a group A consists of MFPs 100A-1, 100A-2, . . . , and a group B consists of MFPs 100B-1, 100B-2, . . . . One MFP of the plurality of MFPs included in each group relays communication between an apparatus group to which the MFP itself belongs and another apparatus group. In other words, each apparatus group includes an MFP which can relay communication with another apparatus group.

Here, it is assumed that a first MFP has requested a second MFP to communicate with a third MFP. Then, it is assumed that, in response to the request, the second MFP communicates with the third MFP and the second MFP sends a result of communication to the first MFP as an answer. Then, in this series of communication procedures, the second MFP has relayed communication between the first MFP and the third MFP. Namely, the first MFP has communicated with the third MFP with the second MFP being interposed. Such relay of communication by the second MFP is also referred to as "mediation" in the description below. In the description below, an MFP which can relay communication with another apparatus group among the plurality of MFPs included in an apparatus group is also referred to as a "mediation MFP".

An MFP included in each apparatus group has saved in advance an access destination of the mediation MFP in the apparatus group to which the MFP itself belongs (an own apparatus group). The MFP has not saved an access destination of an MFP belonging to another apparatus group outside the own apparatus group. Then, the client MFP requests the mediation MFP in the own apparatus group to inquire of each MFP belonging to another apparatus group whether or not it has saved a job associated with a log-in user. In the description below, a request for inquiring of each MFP whether or not it has saved a job associated with a log-in user is also simply referred to as an "inquiry request".

The MFP serving as the mediation MFP has further saved in advance an access destination of the mediation MFP in another apparatus group. When the mediation MFP accepts the request from the MFP in the own apparatus group, it requests the mediation MFP in another apparatus group to inquire of MFPs in each apparatus group.

When a request is accepted from the mediation MFP in another apparatus group, the mediation MFP may inquire of each MFP belonging to the own apparatus group whether or not it has saved a job associated with a designated log-in user in a memory. By doing so, an amount of communication can be smaller than in a case that the client MFP inquires of all MFPs within the system.

In that case, however, an amount of communication by each mediation MFP increases. Then, preferably, one MFP of the plurality of MFPs included in each apparatus group manages a state of storage of jobs in the memory of each MFP within the own apparatus group. In other words, each apparatus group includes an MFP which can manage a state of storage of jobs in the memory of each MFP within the own apparatus group. In the description below, an MFP which can manage a state of storage of jobs in the memory of each MFP within the own apparatus group is also referred to as a "management MFP". The MFP serving as the management MFP resisters information on jobs saved in the memory of each MFP within the own apparatus group, in a memory of the MFP itself or in a database of the memory of another apparatus which can be accessed.

In order to realize management by the management MFP, preferably, each MFP has saved in advance an access destination of the management MFP in the own apparatus group. Then, each MFP gives a notification each time a job is stored in the memory. Alternatively, the management MFP may request of each MFP within the own apparatus group for job information of jobs saved in the memory at timing defined in advance, for example, at prescribed time intervals, and may register the job information in a database or update the job information based thereon.

The mediation MFP in each apparatus group which has accepted the request inquires of the management MFP in the own apparatus group about a storage MFP of which memory has saved a job associated with a designated log-in user, and obtains an answer thereto. In other words, the management MFP refers to the memory in response to the inquiry from the mediation MFP in the own apparatus group, specifies a storage MFP which has saved a job associated with the designated log-in user, and transmits information which allows the storage MFP to be specified to the mediation MFP. Hereinafter, transmission in response to the request, of information which allows a storage MFP to be specified to an MFP which is a source of request is also referred to as "to answer".

The management MFP gives an answer about the storage MFP which has saved the job associated with the designated log-in user to the mediation MFP in another apparatus group which has made the request. The client MFP to which the answer has been transferred directly requests of the storage MFP for the job information for list display. Thus, the client MFP can specify a storage MFP which has saved the job associated with the log-in user among the MFPs belonging to another apparatus group, by making a request for inquiring of the mediation MFP in the own apparatus group without communicating for inquiring of all MFPs included in the present system whether or not there is a job, and can obtain job information by communicating only with that MFP. In addition, the mediation MFP can also specify a storage MFP within the own apparatus group and give an answer to the mediation MFP in another apparatus group by inquiring only of the management MFP without inquiring of all MFPs within the own apparatus group whether or not there is a job in response to the request from the mediation MFP in another apparatus group.

Figure 3:
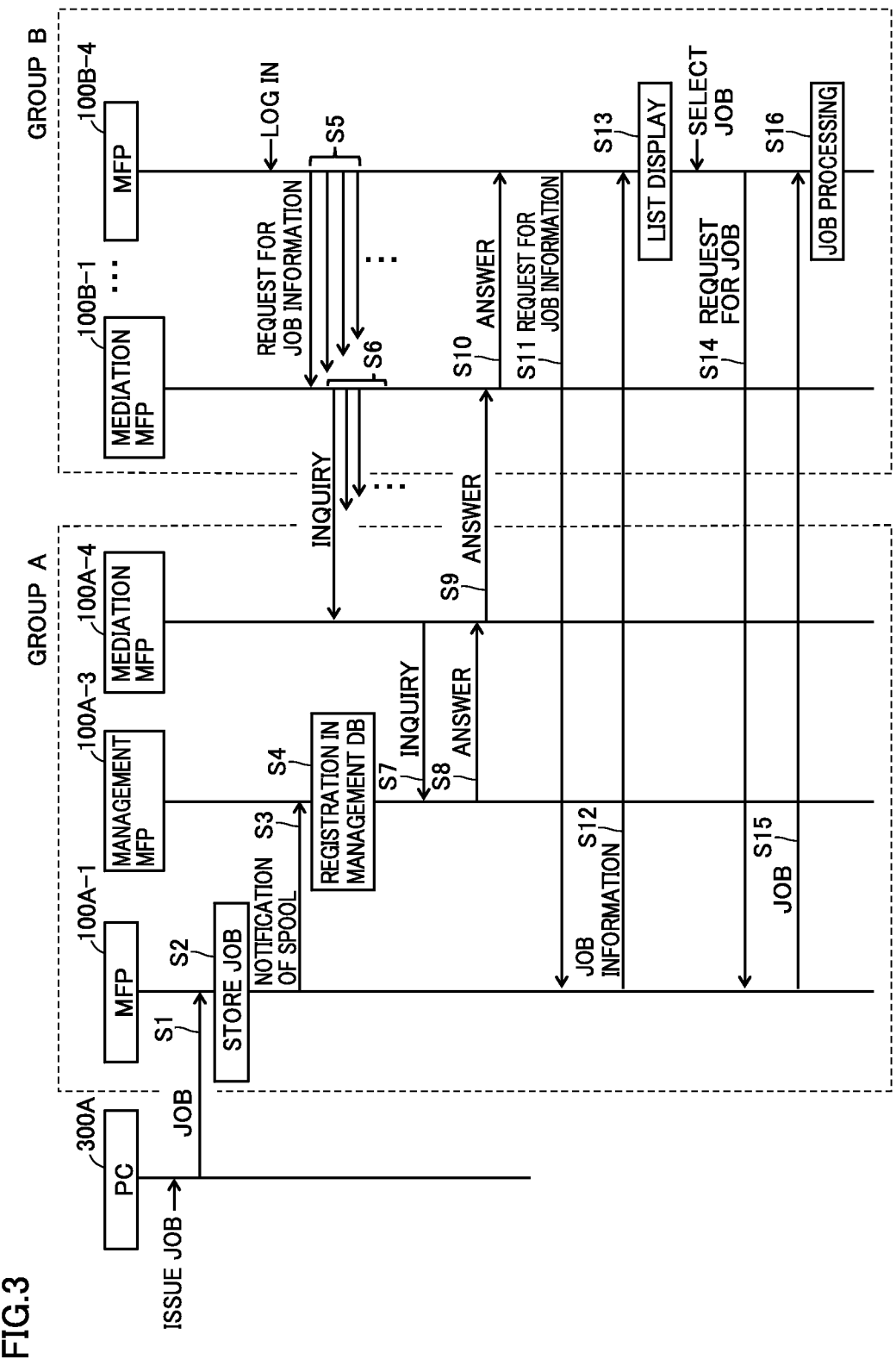
FIG. 3 is a diagram representing overview of an operation of the system.

FIG. 3 is a diagram representing overview of an operation of the system. In FIG. 3, it is assumed that an MFP 100A-4 serves as the mediation MFP in group A, an MFP 100A-3 serves as the management MFP in group A, and MFP 100B-1 serves as the mediation MFP in group B.

Referring to FIG. 3, when a user creates a job with PC 300A and performs an operation for issuance, the job is passed from PC 300A to MFP 100A-1 (step S1) and stored in the memory of MFP 100A-1 (step S2). Thus, MFP 100A-1 now serves as the storage MFP of the job.

The operation for issuance of the job from PC 300A corresponds, for example, to an operation by a user to create a document file with the use of an application for document creation installed in PC 300A and to indicate printing with the use of a printer driver. The printer driver develops a document file passed form the application for document creation to an image which can be printed and generates a job for printing by adding a control signal in accordance with print setting made by the user. Then, the printer driver transfers the job to MFP 100A-1. MFP 100A-1 which is a transfer destination may be brought in correspondence in advance with PC 300A or the user, may be determined in response to an instruction from the user, or may dynamically be determined in accordance with a state of storage in MFP 100 within the system at the time of issuance of the job.

MFP 100A-1 serving as the storage MFP notifies the management MFP of storage of the job in the memory by transmitting the job information of the job to MFP 100A-3 serving as the management MFP in the own apparatus group (step S3). MFP 100A-3 serving as the management MFP registers the job information of which notification has been given in a management database (step S4).

Then, the user logs in an MFP 100B-4 in group B which is different from MFP 100A-1 of which memory has saved a job associated with the user himself/herself. For example, such a scene that a job is issued from PC 300A at a desk of the user himself/herself and thereafter the user moves to a meeting room or another floor and logs in an MFP installed there is assumed. MFP 100B-4 in which the user has logged serves as the client MFP.

MFP 100B-4 serving as the client MFP requests of each MFP 100 in group B which is the own apparatus group for job information of a job saved in the memory in association with the log-in user (step S5).

Each MFP 100 in group B which has received this request performs such processing as checking whether or not the job corresponding to the request has been saved in the memory of the MFP itself similarly to the MFP included in a common ubiquitous system, and returning the job information to the client MFP if the job is stored. In addition, MFP 100B-1 serving as the mediation MFP in group B requests the mediation MFP in another apparatus group to inquire of each MFP in another apparatus group whether or not it has saved the corresponding job (step S6).

MFP 100A-4 serving as the mediation MFP in group A which has accepted the request from MFP 100B-1 serving as the mediation MFP in group B inquires of MFP 100A-3 serving as the management MFP in group A about a storage MFP which has saved the corresponding job (step S7).

MFP 100A-3 serving as the management MFP which has received the inquiry specifies an MFP which has saved the corresponding job by referring to the management database and gives an answer to MFP 100A-4 (step S8). In this example, MFP 100A-3 specifies MFP 100A-1 as the storage MFP and gives an answer to MFP 100A-4.

MFP 100A-4 serving as the mediation MFP in group A which has received the answer from MFP 100A-3 serving as the management MFP in group A transfers the answer to MFP 100B-1 serving as the mediation MFP in group B (step S9). MFP 100B-1 serving as the mediation MFP in group B gives MFP 100B-4 an answer about the storage MFP which has saved the corresponding job (step S10). Namely, in this example, MFP 100B-1 gives an answer to MFP 100B-4 serving as the client MFP that MFP 100A-1 is the storage MFP which has saved the job in association with the log-in user.

MFP 100B-4 serving as the client MFP requests of MFP 100A-1 serving as the storage MFP for job information of the corresponding job for list display based on the answer (step S11) and obtains the job information from MFP 100A-1 (step S12). MFP 100B-4 has operation panel 16 display in a selectable manner, a list of jobs issued by the log-in user based on the job information obtained from each MFP (step S13).

When MFP 100B-4 serving as the client MFP accepts an operation to select a job to be processed from a user, it requests of the storage MFP for the corresponding job. For example, when a job saved in MFP 100A-1 is selected, as shown in FIG. 3, MFP 100B-4 requests of MFP 100A-1 which is the storage MFP of the job for the selected job (step S14) and obtains the job (step S15). Then, MFP 100B-4 performs processing for printing the job in response to an instruction from a user (step S16).

As operations above are performed in the present system, an amount of communication for the client MFP to request of other MFPs for job information for list display can be suppressed.

The mediation MFP in another apparatus group, however, also requests the mediation MFP to make an inquiry about an MFP which has saved a corresponding job within the own apparatus group. Therefore, an amount of processing simultaneously produced in the mediation MFPs may also increase.

Preferably, the MFP serving as the mediation MFP saves in advance a threshold value for the number of communications which can simultaneously be established. Each time a request for communication with the mediation MFP takes place, the mediation MFP counts the number of communications and determines whether or not the number has reached the threshold value. Preferably, the mediation MFP performs processing for reducing the number of communications when the number of communication requests has reached the threshold value.

Processing as follows represents a first example of processing for reducing the number of communications. An MFP serving as the mediation MFP analyzes contents requested through communication and specifies an order of precedence of each request based on a priority of contents in the request which has been saved in advance. Then, a representative MFP cuts off communication in accordance with the order of precedence until the number of communications is smaller than the threshold value.

FIG. 4 is a diagram representing a specific example of a priority defined in advance for each content in a request. For an MFP serving as the mediation MFP, a priority is defined for each content of connection in a list format as in FIG. 4 by way of example. Specifically, referring to FIG. 4, a request for an inquiry about an MFP which has saved a job associated with a specific user from the mediation MFP in another apparatus group (inquiry about storage MFP from mediation MFP in another group) is set to be high in priority, for which the first order of precedence is set. An inquiry of the management MFP which has received the request about an MFP which has saved the job (inquiry of management MFP about storage MFP) is also set to be high in priority, for which the second order of precedence is set. A request for job information for list display of jobs from another MFP (request for job information for list display) is also set to be high in priority, for which the third order of precedence is set. A request for printing issued to an MFP is also set to be high in priority, for which the fourth order of precedence is set.

On the other hand, a request for a saved file, a request for thumbnail information for adding a thumbnail to a list of jobs (request for thumbnail information for thumbnail display), and a request for preview information for adding a preview to a list of jobs (request for preview information for preview display) are set to be low in priority.

As the priority (the order of precedence) is set as exemplified in FIG. 4, a series of operations at the time when a user logs in an MFP included in the present system, designates a job, and indicates printing is smoothly performed and lowering in operability of a user can be suppressed. On the other hand, since there is also a case that deletion of a file, thumbnail display, or preview display does not necessarily require immediate responsiveness, lowering in operability of the user does not necessarily occur.

Definition of the priority in FIG. 4 may be registered in advance in the mediation MFP or may be registered and changed by a specific user such as a manager. Such registration may be made in accordance with an operation through operation panel 16 of the mediation MFP or may be made in response to an instruction from another apparatus such as a PC through the network. In addition, contents of definition of the priority in FIG. 4 may be different for each mediation MFP, that is, for each group. For example, for each group, a user corresponding to a manager of the group may set contents for an MFP serving as the mediation MFP in that group.

When an MFP serving as the mediation MFP accepts a message requesting connection from another MFP based on a communication protocol such as simple object access protocol (SOAP) and when the number of messages accepted within a prescribed period has reached the threshold value, it analyzes the message and specifies contents in the request. Then, a representative MFP provides an order of precedence to each communication based on the definition in FIG. 4.

The mediation MFP cuts off communication in the ascending order of precedence until the number of communications is smaller than the threshold value. Preferably, the mediation MFP notifies an MFP which is a communication counterpart of a reason for cut-off, such as a notification of being busy, at the time of cut-off of communication. More preferably, the mediation MFP requests of an MFP which is a communication counterpart for re-connection after cut-off at the time of cut-off of communication. Here, the mediation MFP calculates a stand-by time period until re-connection can be made after cut-off based on current processing load, and notifies the MFP of the stand-by time period. Thus, the mediation MFP can efficiently connect communication and perform processing in accordance with the request.

Processing as follows represents a second example of processing for reducing the number of communications. An MFP serving as the mediation MFP refrains for a certain period of time from inquiring of the management MFP in response to an inquiry request from the mediation MFP in another apparatus group and saves the inquiries during that period. Then, the mediation MFP transfers a group of saved inquiries to the management MFP as one inquiry. Thus, communication with the management MFP can be suppressed, although a time period until an answer is given to the mediation MFP in another apparatus group is slightly longer.

Figure 5:
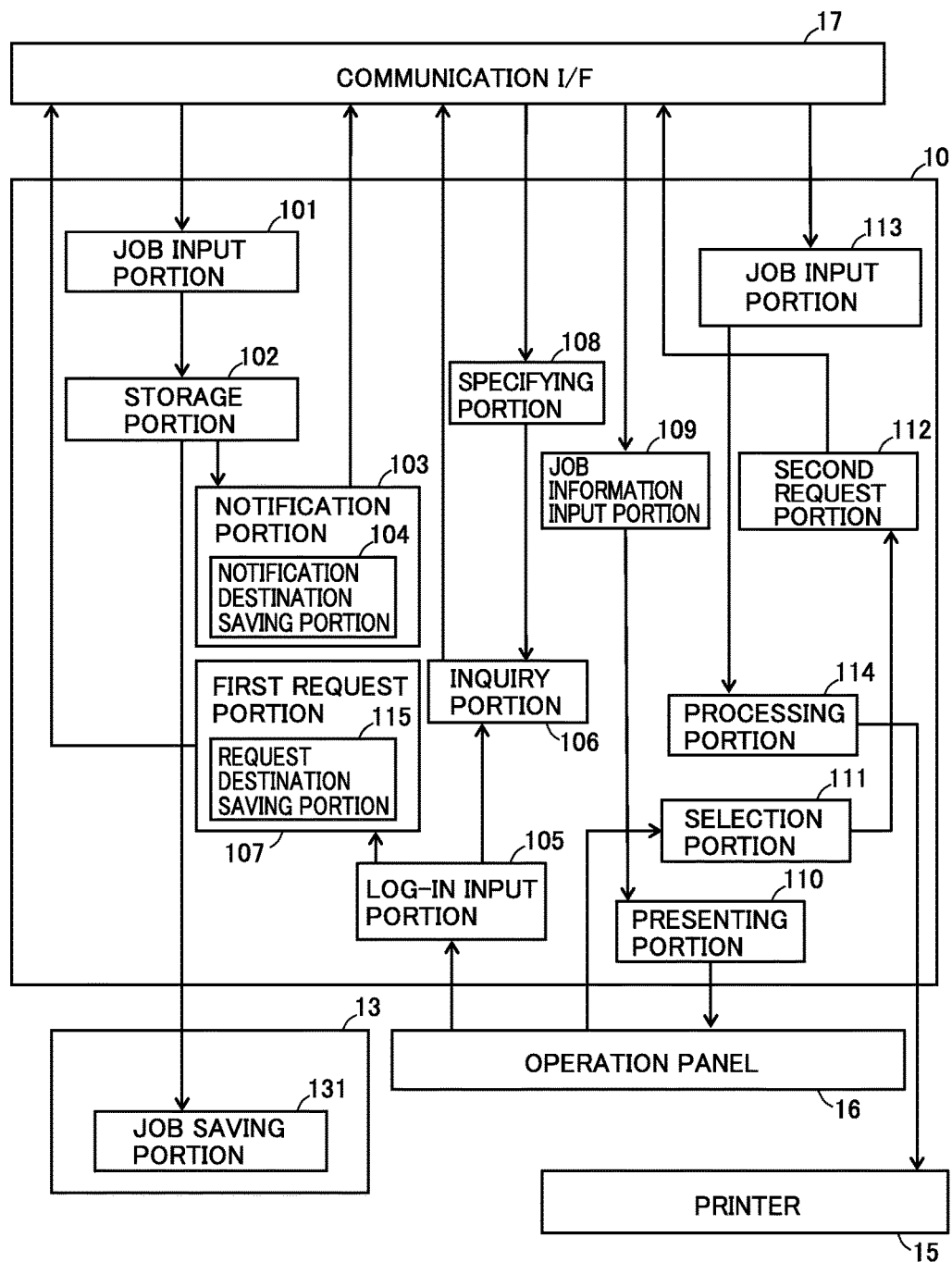
FIGS. 5 to 7 are block diagrams representing a specific example of a functional configuration of the MFP.
Figure 6:
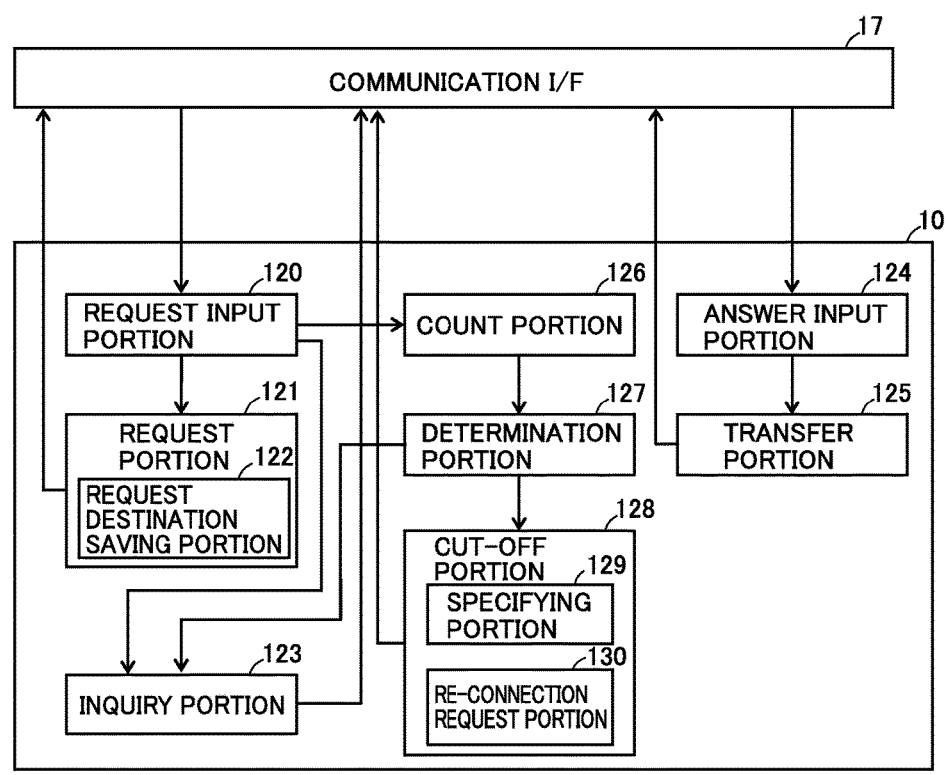
Figure 7:
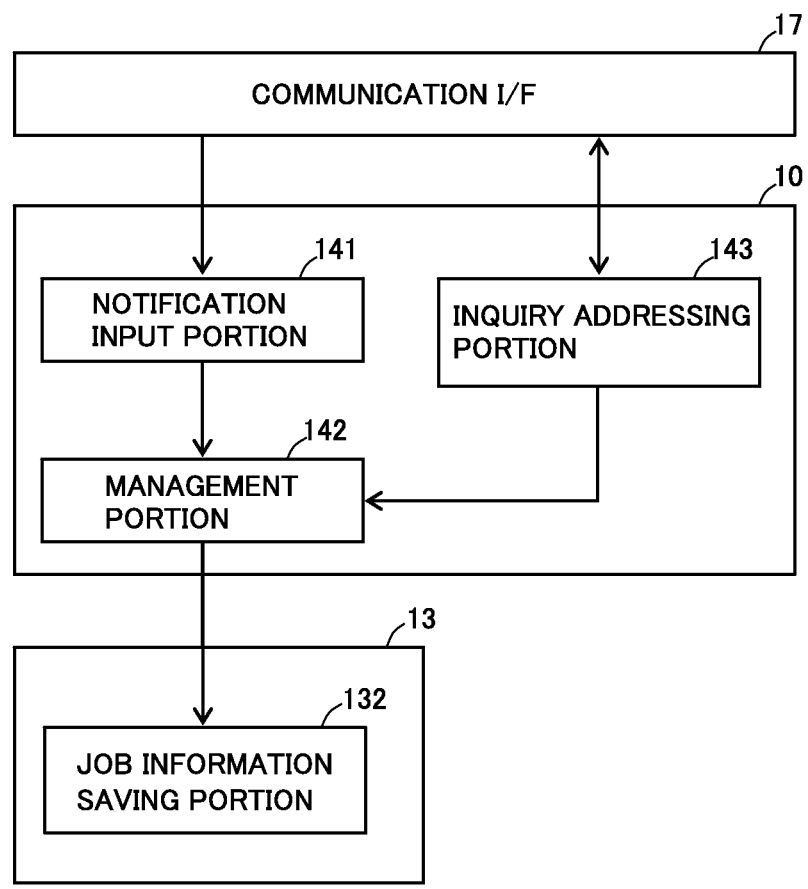

FIGS. 5 to 7 are block diagrams showing a specific example of a functional configuration of MFP 100 included in the present system for performing the operations above. Each function shown in FIGS. 5 to 7 is mainly implemented by CPU 10 as CPU 10 of MFP 100 reads a program saved (installed) in ROM 11 on RAM 12 and executes the program. Some functions, however, may be implemented by another configuration shown in FIG. 2 or another hardware configuration such as a not-shown electric circuit. FIG. 5 shows a functional configuration when MFP 100 is neither a mediation MFP nor a management MFP, FIG. 6 shows a functional configuration added to the configuration in FIG. 5 when it is the mediation MFP, and FIG. 7 shows a functional configuration added to the configuration in FIG. 5 when it is the management MFP. By way of example, in MFP 100 included in the present system, a program capable of exhibiting all functions in FIGS. 5 to 7 is installed in ROM 11 in advance, and CPU 10 may select a function to be exhibited based on setting of each MFP about whether or not it should serve as the mediation MFP, the management MFP, or neither of them. The setting may be made, for example, only by a specific user such as a manager or a serviceperson.

Referring to FIG. 5, in all MFPs 100 included in the present system, HDD 13 representing one example of the memory includes a job saving portion 131 which is a saving area for saving jobs.

Referring further to FIG. 5, CPU 10 includes a job input portion 101, a storage portion 102, a notification portion 103, a log-in input portion 105, an inquiry portion 106, a first request portion 107, a specifying portion 108, a job information input portion 109, a presenting portion 110, a selection portion 111, a second request portion 112, a job input portion 113, and a processing portion 114.

Job input portion 101 accepts an input of a job for printing. Storage portion 102 has a job saved in a memory by having the job stored in the memory. Notification portion 103 notifies the management MFP of information on saved jobs by referring to an access destination of the management MFP saved in advance in a notification destination saving portion 104.

Log-in input portion 105 accepts a log-in operation by a user and performs log-in processing.

Inquiry portion 106 inquires of an MFP in the own apparatus group whether or not there is a job associated with the log-in user and makes a request for job information.

First request portion 107 requests of the mediation MFP in the own apparatus group for an inquiry about an MFP in another apparatus group by referring to an access destination of the mediation MFP saved in a request destination saving portion 115.

Specifying portion 108 specifies a storage MFP which has saved a corresponding job, of MFPs in another apparatus group, based on an answer from the mediation MFP in another apparatus group. Inquiry portion 106 requests of the specified storage MFP for job information.

Job information input portion 109 accepts an input of job information from the storage MFP which has saved the corresponding job. Presenting portion 110 presents a list of jobs on operation panel 16 in a selectable manner, based on the job information. Selection portion 111 accepts selection of a job to be printed from the list of jobs.

Second request portion 112 requests of the storage MFP which has saved the selected job for the job. Job input portion 113 accepts an input of a job from the storage MFP which has saved the job. Processing portion 114 performs print processing of the job with the use of printer 15.

The mediation MFP further has the functional configuration in FIG. 6 in addition to the functional configuration in FIG. 5. Referring to FIG. 6, CPU 10 of MFP 100 serving as the mediation MFP further includes a request input portion 120, a request portion 121, an inquiry portion 123, an answer input portion 124, and a transfer portion 125.

Request input portion 120 accepts a request from another MFP through communication I/F 17. When an accepted request is a request for an inquiry about an MFP in another apparatus group from an MFP in the own apparatus group, request portion 121 requests of the mediation MFP in another apparatus group for the inquiry by referring to an access destination of the mediation MFP in another apparatus group which has been saved in a request destination saving portion 122. Answer input portion 124 accepts an input of an answer about the storage MFP in response to the request from the mediation MFP in another apparatus group. Transfer portion 125 transfers the answer to the MFP which has made the inquiry within the own apparatus group.

When the accepted request is an inquiry about a storage MFP which has saved a corresponding job within the own apparatus group from the mediation MFP in another apparatus group, inquiry portion 123 inquires of the management MFP in the own apparatus group about a storage MFP which has saved a corresponding job.

CPU 10 serving as the mediation MFP further includes a count portion 126, a determination portion 127, and a cut-off portion 128 as a function for reducing the number of communications.

Count portion 126 counts the number of communications for simultaneously requesting processing. Determination portion 127 has a threshold value for the number of communications which can simultaneously be established saved in advance, and determines whether or not the number of communications has reached the threshold value based on comparison between the counted number of communications and the threshold value. Cut-off portion 128 performs processing for cutting off prescribed communication in accordance with a result of determination in determination portion 127.

Cut-off portion 128 has the priority in FIG. 4 stored. Cut-off portion 128 includes a specifying portion 129. When the number of connections has reached the threshold value, specifying portion 129 analyzes contents requested through communication and specifies the order of precedence based on the priority in FIG. 4. Cut-off portion 128 cuts off connection to an MFP in the own apparatus group in accordance with the order of precedence until the number of connections is smaller than the threshold value. Preferably, cut-off portion 128 cuts off connection to another MFP also based on a condition of load of MFP 100 in addition to the order of precedence.

Preferably, cut-off portion 128 further includes a re-connection request portion 130. Re-connection request portion 130 requests of a communication counterpart with which communication is to be cut off for re-connection after cut-off. Preferably, re-connection request portion 130 calculates a stand-by time period from cut-off until re-connection and has the request include the stand-by time period.

Preferably, when the number of connections has reached the threshold value, inquiry portion 123 refrains for a certain period of time from inquiring of the management MFP in the own apparatus group and has inquiries during that period saved. Then, after lapse of the certain period of time, inquiry portion 123 issues one or more inquiries saved during the stand-by time period to the management MFP as one inquiry.

The management MFP further has the functional configuration in FIG. 7 in addition to the functional configuration in FIG. 5. Referring to FIG. 7, HDD 13 representing one example of the memory of MFP 100 serving as the management MFP includes a job information saving portion 132 which is a saving area for saving information on a job saved in the MFP in the own apparatus group.

Referring further to FIG. 7, CPU 10 of MFP 100 serving as the management MFP further includes a notification input portion 141, a management portion 142, and an inquiry addressing portion 143.

Notification input portion 141 accepts a notification of a job stored in the memory of the MFP from the MFP in the own apparatus group. Management portion 142 has correspondence between the job and a storage MFP, which has saved the job, saved by registering job information of the job of which notification has been given in a memory. When inquiry addressing portion 143 accepts an inquiry about an MFP which has saved a job associated with a designated log-in user from the mediation MFP in the own apparatus group, it specifies a corresponding storage MFP by referring to registration in the memory and gives an answer.

FIGS. 8 to 12 are flowcharts showing a flow of operations in MFP 100. The flowcharts in FIGS. 8 to 12 are implemented as CPU 10 of MFP 100 reads a program saved in ROM 11 on RAM 12 and executes the program to thereby exhibit the functions in FIGS. 5 to 7.

Figure 8:
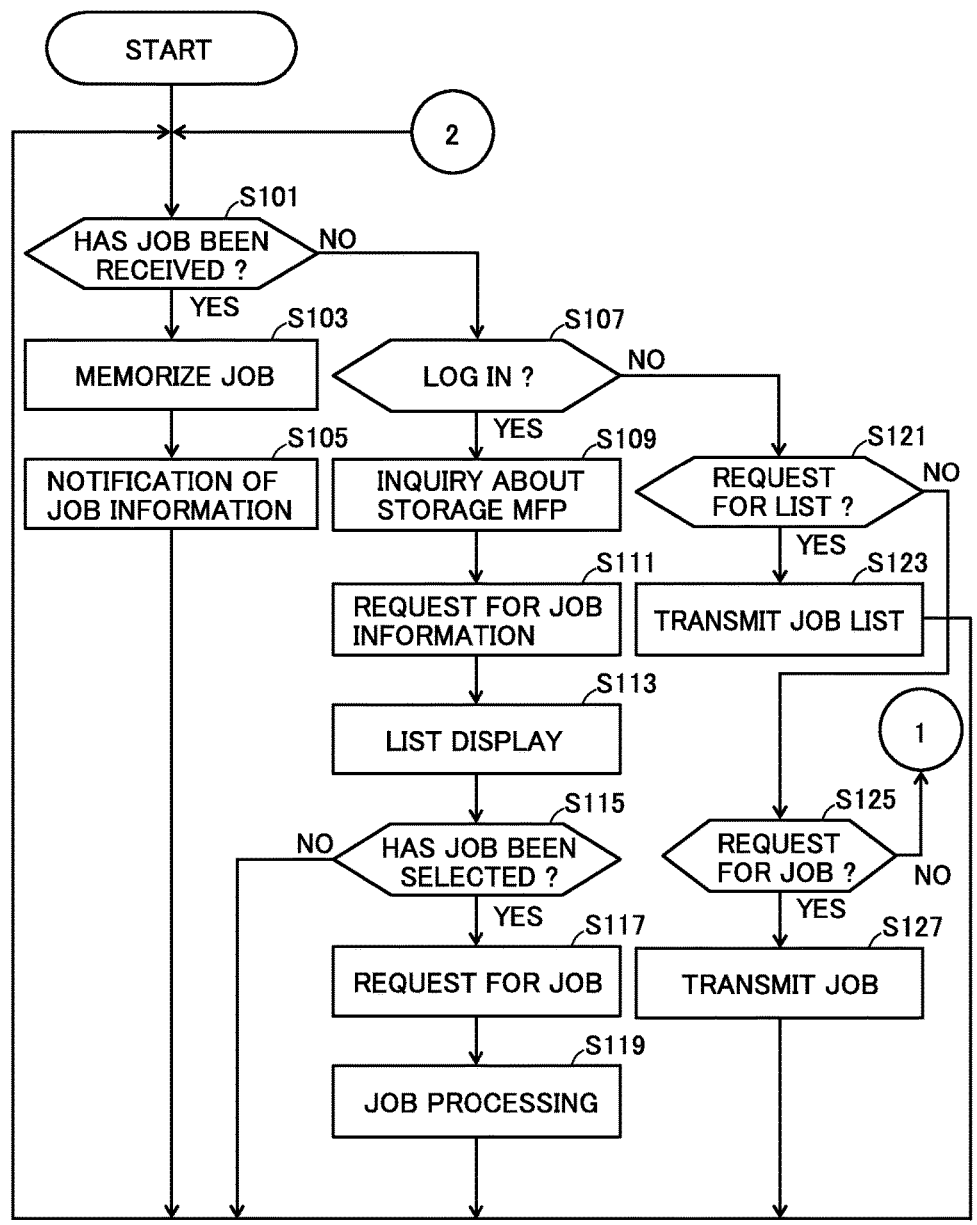
FIGS. 8 to 10 are flowcharts representing a flow of operations of the MFP.

Referring to FIG. 8, when CPU 10 accepts issuance of a job from such an information processing apparatus as a PC (YES in step S101), it has the memory store and save the input job (step S103). Then, CPU 10 notifies the management MFP saved in advance of storage of the job in the memory (step S105). In step S105, CPU 10 transfers job information including information specifying the job stored in the memory and information specifying a user who has issued the job to the management MFP. Processing in steps S101 to S105 is processing at the time when MFP 100 serves as the storage MFP.

When CPU 10 accepts log-in by a user (NO in step S101 and YES in step S107), it inquires of each MFP in the own apparatus group about an MFP which has saved a job associated with the log-in user (step S109). This inquiry includes also an inquiry about an MFP in another apparatus group through the mediation MFP in the own apparatus group.

When CPU 10 specifies an MFP which has saved a corresponding job among MFPs in another apparatus group, CPU 10 requests of the MFP for job information (step S111). The inquiry about an MFP in the own apparatus group can be a request for job information.

CPU 10 obtains job information from the storage MFP which has saved the corresponding job and has operation panel 16 display a list of jobs in a selectable manner (step S113). When selection of a job to be printed from the list is accepted (YES in step S115), CPU 10 requests of the storage MFP of the job for the selected job (step S117). Then, CPU 10 subjects the job obtained from the storage MFP to print processing (step S119). Processing in steps S107 to S119 is processing at the time when MFP 100 serves as the client MFP.

When CPU 10 accepts from another MFP, a request for job information on a job saved in the memory of MFP 100 (NO in steps S101 and S107 and YES in step S121), it transmits the job information of the corresponding job to another MFP (step S123). When CPU 10 accepts from another MFP, a request for a job saved in the memory of MFP 100 (NO in steps S101, S107, and S121 and YES in step S125), it transmits the corresponding job (step S127). Processing in steps S121 to S123 and in steps S125 to S127 is processing at the time when MFP 100 serves as the storage MFP.

Figure 9:
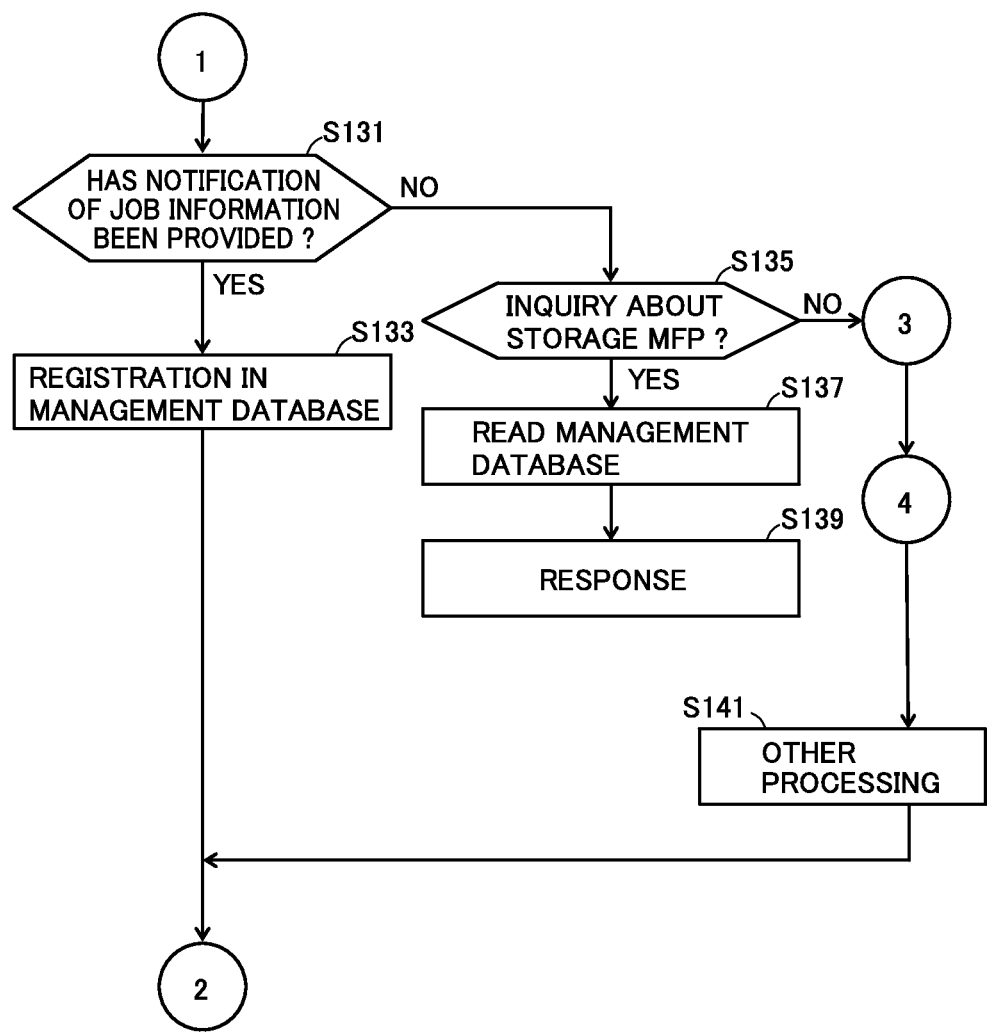

Referring to FIGS. 8 and 9, when CPU 10 accepts a notification of storage of a job in step S105 from the MFP in the own apparatus group (NO in steps S101, S107, S121, and S125 and YES in step S131), it has job information registered in a management database saved in the memory of MFP 100 (step S133). When CPU 10 accepts an inquiry about an MFP which has saved a job associated with a certain log-in user from the mediation MFP in the own apparatus group (NO in steps S101, S107, S121, S125, and S131 and YES in step S135), it reads the management database and specifies a storage MFP which has saved the corresponding job (step S137). CPU 10 gives an answer about the specified storage MFP to the mediation MFP (step S139). Processing in steps S131 to S133 and in steps S135 to S139 is processing at the time when MFP 100 serves as the management MFP.

Figure 10:
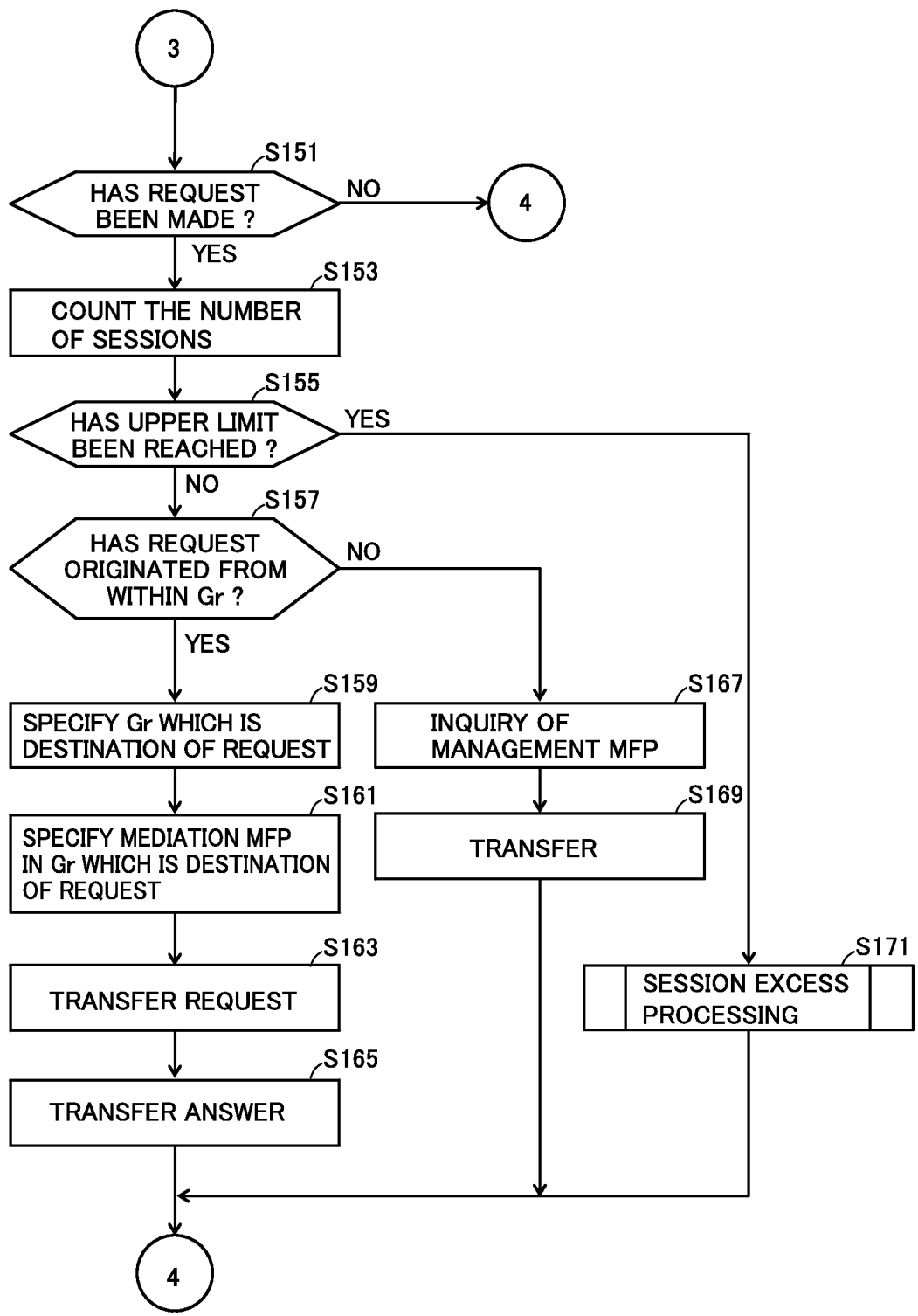

Referring to FIGS. 8 to 10, when CPU 10 accepts a request for an inquiry about an MFP which has saved a job associated with a certain log-in user from another MFP (NO in steps S101, S107, S121, S125, S131, and S135 and YES in step S151), it branches processing in accordance with whether the request originates from an MFP in the own apparatus group or from the mediation MFP in another apparatus group. Namely, when the request for an inquiry is a request from an MFP in the own apparatus group (YES in step S157), CPU 10 specifies another apparatus group which has made the request (step S159) and specifies the mediation MFP in another apparatus group (step S161). Then, CPU 10 transfers the request to the mediation MFP in another apparatus group (step S163). When an answer to the request, that is, an answer about an MFP which has saved a job associated with the certain log-in user, is obtained from the mediation MFP in another apparatus group, CPU 10 transfers the answer to the MFP in the own apparatus group which is a source of the request (step S165).

When the request for the inquiry is a request from the mediation MFP in another apparatus group (NO in step S157), CPU 10 inquires of the management MFP in the own apparatus group about an MFP which has saved a corresponding job (step S167). This inquiry corresponds to an inquiry in step S135. When an answer to the request, that is, an answer about an MFP which has saved a job associated with the certain log-in user, is obtained from the management MFP, CPU 10 transfers the answer to the mediation MFP in another apparatus group which is a source of the request (step S169).

Preferably, when the request is accepted, CPU 10 counts the number of connections to other apparatuses (step S153) and determines whether or not the number has reached the threshold value saved in advance as the upper limit of connection. When the number of connections to other apparatuses has not reached the upper limit of connection (NO in step S155), CPU 10 performs processing in step S157 or later. When the number of connections to other apparatuses has reached the upper limit of connection (YES in step S155), CPU 10 performs processing for reducing the number of communications (session excess processing) (step S171).

Figure 11:
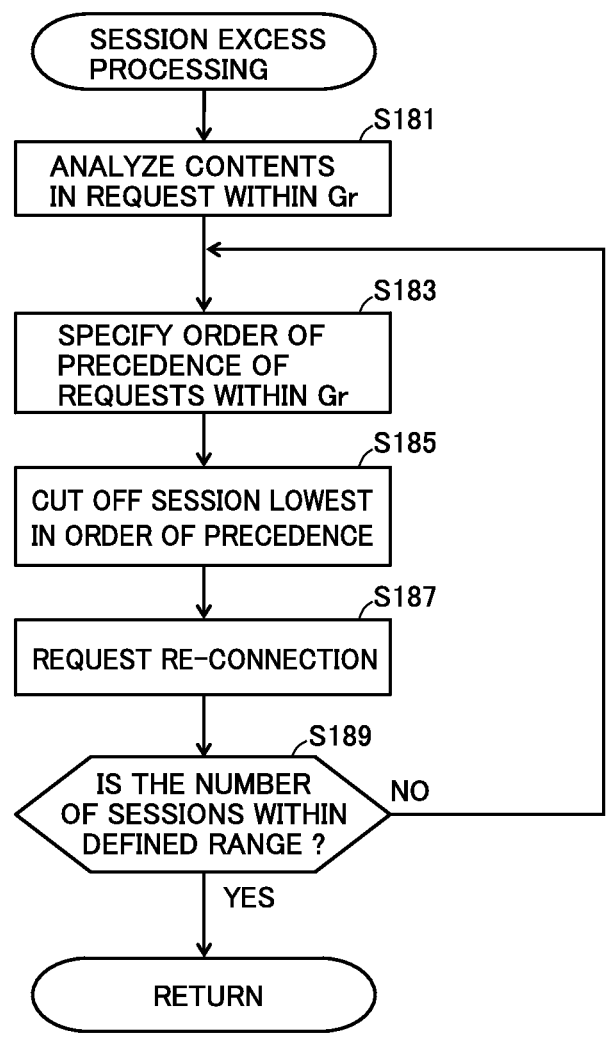
FIG. 11 is a diagram representing one example of processing in step S171 in FIG. 8.

FIG. 11 is a diagram representing one example of processing in step S171. The example in FIG. 11 shows processing in which CPU 10 cuts off connection until the number of connections reaches the upper limit, in connection with communication from MFPs in the own apparatus group. Namely, referring to FIG. 11, CPU 10 analyzes contents in a request about connection from MFPs in the own apparatus group, of connections (step S181). CPU 10 specifies an order of precedence of requests based on connections from MFPs in the own apparatus group in accordance with the priority saved in advance as in FIG. 4 (step S183). Then, CPU 10 cuts off communication in which a request lowest in order of precedence is made (step S185). Preferably, when communication is cut off CPU 10 requests of a communication counterpart for re-connection (step S187) and then cuts off communication in which the request lowest in order of precedence is made. CPU 10 sets communication within the upper limit by repeating processing in steps S183 to S187 until the number of connections to other apparatuses is within the upper limit.

In FIG. 11, only requests from MFPs in the own apparatus group are to be analyzed in step S181. As in FIG. 4, however, when a priority is set for requests from MFPs in the own apparatus group and also for requests from MFPs belonging to another apparatus group, CPU 10 may analyze requests in step S181 without distinction between apparatus groups to which MFPs belong.

Figure 12:
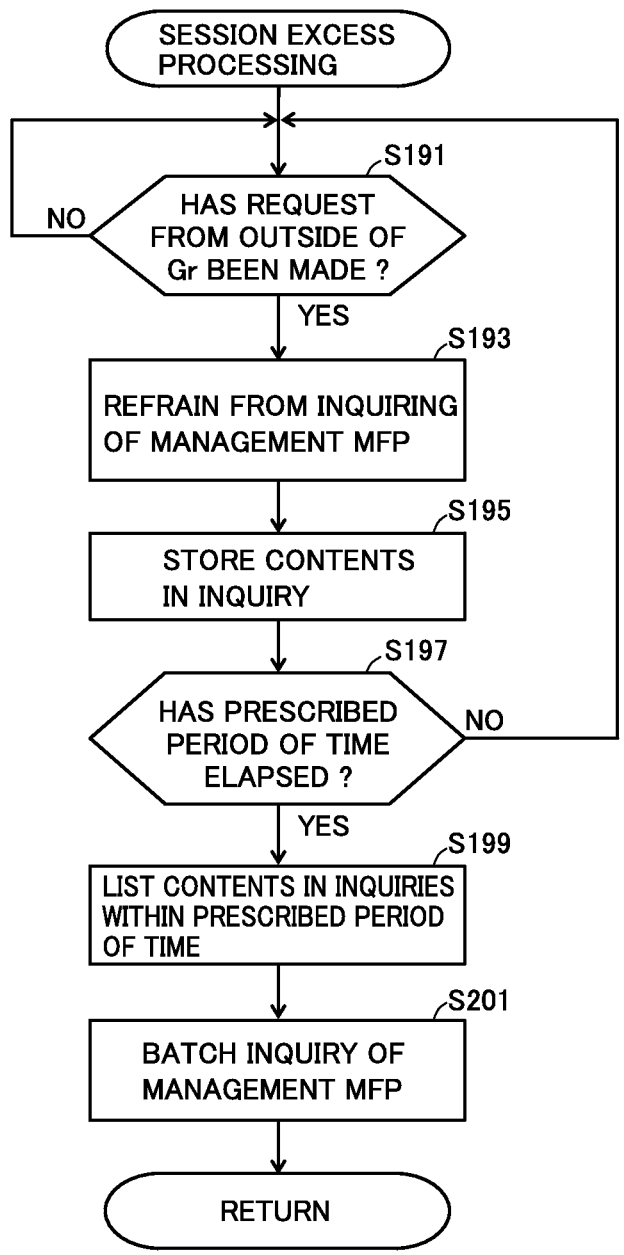
FIG. 12 is a diagram representing another example of processing in step S171 in FIG. 8.

FIG. 12 is a diagram representing another example of processing in step S171. Referring to FIG. 12, when CPU 10 accepts an inquiry request from the mediation MFP in another apparatus group (YES in step S191), it refrains for a prescribed period of time from inquiring of the management MFP in the own apparatus group (step S193) and has contents of inquiries which have not been made saved (step S195). After lapse of the prescribed period of time (YES in step S197), CPU 10 lists a group of inquiries to be issued to the management MFP in the own apparatus group which has been saved in step S195 (step S199) and makes a batch inquiry to the management MFP (step S201).

Processing in steps S151 to S171, in steps S181 to S189, and in steps S191 to S201 is processing at the time when MFP 100 serves as the mediation MFP.

When a request other than the above such as a printing request or a request for deletion of a file is issued to MFP 100 (NO in steps S101, S107, S121, S125, S131, and S135), CPU 10 performs indicated processing (step S141).

As each MFP operates as above in the present system, when the number of MFPs included in the system may abruptly increase, a client MFP can efficiently obtain information for list display of jobs for each apparatus group. Therefore, necessity for a highly sophisticated operation unit or a large-capacity memory in each MFP can be avoided. In addition, since increase in amount of communication can be suppressed, increase in processing time period such as delay in list display of jobs can be suppressed.

Furthermore, a program for having processing described above performed by a computer mounted on an image formation apparatus having a printing function such as an MFP can also be provided. By providing the program, an existing image formation apparatus can function as MFP 100 above and the system can be constructed with the use of existing image formation apparatuses.

Such a program can also be recorded on a computer-readable recording medium such as a flexible disk, a CD-ROM (Compact Disk-Read Only Memory), a ROM, a RAM, and a memory card adapted to a computer, and can be provided as a program product. Alternatively, the program can also be recorded and provided in a recording medium such as a hard disk contained in the computer. Further, the program can also be provided by downloading through the network.

The program according to the present invention may execute the processing by calling a necessary module out of program modules provided as a part of an operating system (OS) of the computer, in a prescribed sequence and at prescribed timing. In such a case, the program itself does not include the module above but executes the processing in cooperation with the OS. Such a program not including the module may also be encompassed in the program according to the present invention.

Alternatively, the program according to the present invention may be provided in a manner incorporated as a part of another program. In such a case as well, the program itself does not include the module included in another program, but the program executes the processing in cooperation with another program. Such a program incorporated in another program may also be encompassed in the program according to the present invention.

The provided program product is installed in a program storage portion such as a hard disk for execution. It is noted that the program product includes the program itself and the recording medium recording the program.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An image processing system comprising a plurality of apparatus groups each comprising a plurality of image formation apparatuses,
    at least one image formation apparatus of said plurality of image formation apparatuses including
        a printer configured to carry out printing based on a print job,
        a memory which stores the print job transferred from another apparatus and associated with user information, and
        a controller configured to
            obtain specifying information, which is information specifying a print job associated with a log-in user, from another image formation apparatus within the image processing system which stores the print job associated with the log-in user in a memory of the another image formation apparatus, by inquiring of the another image formation apparatus about whether the print job associated with the log-in user has been stored in the memory of the another image formation apparatus,
            present in a selectable manner the print job stored in the another image formation apparatus within the image processing system and associated with said log-in user, based on said specifying information, and
            obtain a selected print job from the another image formation apparatus which has stored the print job,
    each said apparatus group including
        a first image formation apparatus configured to relay an inquiry of an image formation apparatus belonging to another apparatus group about whether the print job associated with a log-in user has been stored in said memory of the at least one image formation apparatus, and
        a second image formation apparatus configured to manage the print job stored in each image formation apparatus belonging to the apparatus group,
    said controller of said first image formation apparatus configured to specify a corresponding image formation apparatus and answer to said inquiry by inquiring of said second image formation apparatus in the apparatus group to which said first image formation apparatus belongs about each image formation apparatus of the apparatus group to which the first image formation apparatus belongs which has stored the print job associated with the log-in user designated in said inquiry when said inquiry from a first image formation apparatus in the another apparatus group is accepted.

2. The image processing system according to claim 1, wherein
    said first image formation apparatus saves in advance access destination information of an image formation apparatus which belongs to another apparatus group and can relay said inquiry,
    each of said plurality of image formation apparatuses saves in advance access destination information of said first image formation apparatus and said second image formation apparatus within the apparatus group to which each of said plurality of image formation apparatuses belongs, and
    each of said plurality of image formation apparatuses having a controller configured to
        give a notification of said specifying information of said print job and identification information of each of said plurality of image formation apparatuses itself based on the access destination information of said second image formation apparatus when the print job is stored in said memory of the at least one image formation apparatus, and
        inquire of said first image formation apparatus about said print job directed to the image formation apparatus belonging to another group based on the access destination information of said first image formation apparatus when a request for the print job stored in the memory of the image formation apparatus belonging to said another apparatus group is made.

3. The image processing system according to claim 1, wherein said controller of said at least one image formation apparatus is further configured to notify said second image formation apparatus within the apparatus group to which the at least one image formation apparatus itself belongs of the specifying information of the print job stored in said memory of the at least one image formation apparatus.

4. The image processing system according to claim 1, wherein
    said controller of said at least one image formation apparatus is further configured to request the first image formation apparatus in the apparatus group to which the at least one image formation apparatus itself belongs to make an inquiry about the image formation apparatus belonging to the another apparatus group, and
    to obtain said specifying information includes obtaining the specifying information of said print job by requesting of the another image formation apparatus which has stored the print job specified by said answer from said first image formation apparatus for the specifying information of said print job.

5. The image processing system according to claim 4, wherein
    said controller of said first image formation apparatus is further configured to
        request the first image formation apparatus in said another apparatus group to inquire of the image formation apparatus in said another apparatus group about said print job, when the inquiry about the print job associated with the log-in user is accepted from the first image formation apparatus of the another apparatus group, and inquire of said second image formation apparatus in the apparatus group to which the first image formation apparatus itself belongs about each image formation apparatus in the apparatus group to which said first image formation apparatus itself belongs, which has stored the print job associated with said log-in user, when a request for said inquiry is made by the first image formation apparatus in the another group.

6. The image processing system according to claim 5, wherein
said controller of said first image formation apparatus is further configured to determine whether the number of connections to other image formation apparatuses has reached a threshold value defined in advance, and
to inquire includes refraining for a certain period of time from making one or more said inquiries directed to said second image formation apparatus within the apparatus group to which said first image formation apparatus belongs, and saving said one or more inquires, when the number of connections has reached said threshold value, and after lapse of said certain period of time, making saved said one or more inquiries as combined into one inquiry to said second image formation apparatus.

7. The image processing system according to claim 1, wherein
said controller of said first image formation apparatus is further configured to
determine whether the number of connections to other image formation apparatuses has reached a threshold value defined in advance,
analyze contents of connections with other image formation apparatuses within the apparatus group to which said first image formation apparatus belongs and specify an order of precedence based on a priority of the contents of connections saved in advance, when the number of connections has reached said threshold value, and
cut off connection to another image formation apparatus within the apparatus group to which said first image formation apparatus belongs in accordance with said order of precedence until the number of connections is within said threshold value.

8. The image processing system according to claim 7, wherein
said controller of said first image formation apparatus is further configured to request of said another image formation apparatus for re-connection after cut-off when connection to said another image formation apparatus is cut off.

9. The image processing system according to claim 8, wherein
said request includes a stand-by time period from said cut-off until said re-connection.

10. The image processing system according to claim 7, wherein cut-off of connection to said another image formation apparatus further includes cut-off of connection to said another image formation apparatus also based on a condition of load of said first image formation apparatus.

11. The image processing system according to claim 1, wherein the first image formation apparatus answers the inquiry by inquiring of the second image formation apparatus to determine whether one image formation apparatus of the apparatus group that the first image formation apparatus belongs to has stored the print job associated with the log-in user.

12. An image formation apparatus included in an image processing system including a plurality of apparatus groups each comprising a plurality of image formation apparatuses, comprising:
a memory which stores a print job associated with user information;
a printer which carries out printing based on a print job; and
a controller configured to
request of a predetermined image formation apparatus which belongs to another apparatus group different from the apparatus group to which the image formation apparatus belongs and is configured to relay an inquiry about the print job associated with a log-in user for the inquiry about said print job when the inquiry about the print job associated with a log-in user is received from an image formation apparatus within the apparatus group to which the image formation apparatus belongs, and
inquire of a management image formation apparatus within the apparatus group to which the image formation apparatus belongs, which is configured to manage the print job stored in each image formation apparatus within the apparatus group, about the image formation apparatus within the apparatus group which has stored the print job associated with said log-in user, when a request for said inquiry is made from an image formation apparatus in another apparatus group different from the apparatus group to which the image formation apparatus belongs.

13. The image formation apparatus according to claim 12, which has saved in advance access destination information of an image formation apparatus which belongs to another apparatus group and can relay said inquiry, wherein
to request includes accessing the image formation apparatus which belongs to said another apparatus group and can relay said inquiry, based on said access destination information, and making a request for said inquiry.

14. The image formation apparatus according to claim 12, wherein said controller is further configured to
determine whether the number of connections to other image formation apparatuses has reached a threshold value defined in advance,
analyze contents of connections with other image formation apparatuses within the apparatus group to which the image formation apparatus belongs and specify an order of precedence based on a priority of the contents of connections saved in advance, when the number of connections has reached said threshold value, and
cut off connection to another image formation apparatus within the apparatus group to which the image formation apparatus belongs in accordance with said order of precedence until the number of connections is within said threshold value.

15. The image formation apparatus according to claim 14, wherein said controller is further configured to request of said another image formation apparatus for re-connection after cut-off when connection to said another image formation apparatus is cut off.

16. The image formation apparatus according to claim 15, wherein said request includes a notification of a stand-by time period from said cut-off until said re-connection.

17. The image formation apparatus according to claim 14, wherein cut-off of connection to said another image formation apparatus further includes cut-off of connection to said another image formation apparatus also based on a condition of load of the image formation apparatus.

18. The image formation apparatus according to claim 12, wherein
said controller is further configured to determine whether the number of connections to other image formation apparatuses has reached a threshold value defined in advance, and
to inquire includes refraining for a certain period of time from making one or more said inquiries directed to said management image formation apparatus within the apparatus group to which said image formation apparatus belongs, and saving the one or more inquires, when the number of connections has reached said threshold value, and after lapse of said certain period of time, making said one or more inquiries as combined into one inquiry to said management image formation apparatus.

19. The image formation apparatus according to claim 12, wherein the predetermined image formation apparatus answers the inquiry by inquiring of the management image formation apparatus to determine whether one image formation apparatus of the apparatus group that the predetermined image formation apparatus belongs to has stored the print job associated with the log-in user.

20. A non-transitory computer-readable storage medium storing a program for controlling a computer mounted on an image formation apparatus, said image formation apparatus being included in an image processing system including a plurality of apparatus groups each comprising a plurality of image formation apparatuses, said program causing said computer to:
accept a request for an inquiry about an image formation apparatus which has stored a print job associated with a designated user, from another image formation apparatus;
in response to said request, request of a predetermined image formation apparatus which belongs to another apparatus group different from an apparatus group to which said image formation apparatus belongs and is configured to relay an inquiry about the print job associated with a log-in user for the inquiry about said print job, when said another image formation apparatus is an image formation apparatus within an apparatus group to which said image formation apparatus belongs; and
inquire, in response to said request, of a management image formation apparatus which is an image formation apparatus within an apparatus group to which said image formation apparatus belongs and is configured to manage the print job stored in each image formation apparatus within the apparatus group about the image formation apparatus within said apparatus group which has stored the print job associated with said user, when said another image formation apparatus is an image formation apparatus in another apparatus group different from the apparatus group to which said image formation apparatus belongs.

21. The non-transitory computer readable storage medium according to claim 20, which has saved in advance access destination information of an image formation apparatus which belongs to another apparatus group and can relay said inquiry, wherein
to request includes accessing the image formation apparatus which belongs to said another apparatus group and can relay said inquiry, based on said access destination information, and making a request for said inquiry.

22. The non-transitory computer readable storage medium according to claim 20, wherein said program further causes said computer to:
determine whether the number of connections to other image formation apparatuses has reached a threshold value defined in advance,
analyze contents of connections with other image formation apparatuses within the apparatus group to which the image formation apparatus belongs and specify an order of precedence based on a priority of the contents of connections saved in advance, when the number of connections has reached said threshold value, and
cut off connection to another image formation apparatus within the apparatus group to which the image formation apparatus belongs in accordance with said order of precedence until the number of connections is within said threshold value.

23. The non-transitory computer readable storage medium according to claim 22, wherein said program further causes said computer to request of said another image formation apparatus for re-connection after cut-off when connection to said another image formation apparatus is cut off.

24. The non-transitory computer readable storage medium according to claim 23, wherein said request includes a notification of a stand-by time period from said cut-off until said re-connection.

25. The non-transitory computer readable storage medium according to claim 22, wherein cut-off of connection to said another image formation apparatus further includes cut-off of connection to said another image formation apparatus also based on a condition of load of the image formation apparatus.

26. The non-transitory computer readable storage medium according to claim 20, wherein
said program further causes said computer to determine whether the number of connections to other image formation apparatuses has reached a threshold value defined in advance, and
to inquire includes refraining for a certain period of time from making one or more said inquiries directed to said management image formation apparatus within the apparatus group to which said image formation apparatus belongs, and saving the one or more inquires, when the number of connections has reached said threshold value, and after lapse of said certain period of time, making said one or more inquiries as combined into one inquiry to said management image formation apparatus.

* * * * *